US008218901B2

(12) United States Patent
Vercauteren et al.

(10) Patent No.: US 8,218,901 B2
(45) Date of Patent: *Jul. 10, 2012

(54) ROBUST MOSAICING METHOD, NOTABLY WITH CORRECTION OF MOTION DISTORTIONS AND TISSUE DEFORMATIONS FOR A VIVO FIBERED MICROSCOPY

(75) Inventors: Tom Vercauteren, Paris (FR); Aymeric Perchant, Fontenay sous Bois (FR); Nicholas Ayache, Nice (FR); Xavier Pennec, Antibes (FR); Gregoire Malandain, Antibes Juan les Pins (FR)

(73) Assignee: Institut National de Recherche en Informatique et en Automatique, Le Chesnay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,688

(22) Filed: Jul. 8, 2011

(65) Prior Publication Data

US 2011/0261262 A1    Oct. 27, 2011

Related U.S. Application Data

(63) Continuation of application No. 11/832,674, filed on Aug. 2, 2007, now Pat. No. 7,978,932.

(51) Int. Cl.
*G06K 9/36* (2006.01)
*G06K 9/32* (2006.01)
*H04N 7/00* (2011.01)

(52) U.S. Cl. .................... 382/284; 382/294; 348/36

(58) Field of Classification Search .......... 382/128–134, 382/275, 294–296, 300, 305, 312; 600/447; 345/606, 629, 651; 348/36, 607; 250/492.2
See application file for complete search history.

(56) References Cited

U.S. PATENT DOCUMENTS

| 5,999,662 | A  | * | 12/1999 | Burt et al. ................. 382/284 |
| 7,154,268 | B2 | * | 12/2006 | Kellman et al. ............ 324/309 |
| 7,501,616 | B2 | * | 3/2009  | Wiklof ..................... 250/234 |
| 7,940,282 | B2 | * | 5/2011  | Milanfar et al. ........... 345/606 |
| 8,036,494 | B2 | * | 10/2011 | Chen ........................ 382/299 |

* cited by examiner

*Primary Examiner* — Kanjibhai Patel
(74) *Attorney, Agent, or Firm* — Osha • Liang LLP

(57) ABSTRACT

A method for mosaicing frames from a video sequence is disclosed. Each frame is constituted by a point cloud, and each point in the point cloud is potentially acquired at a different time. The method involves compensating for motion and motion distortion due to acquisition time differences in each frame, applying a global optimization of inter-frame registration to align consistently the frames, and applying a reconstruction algorithm on the registered frames to construct a mosaic.

11 Claims, 9 Drawing Sheets

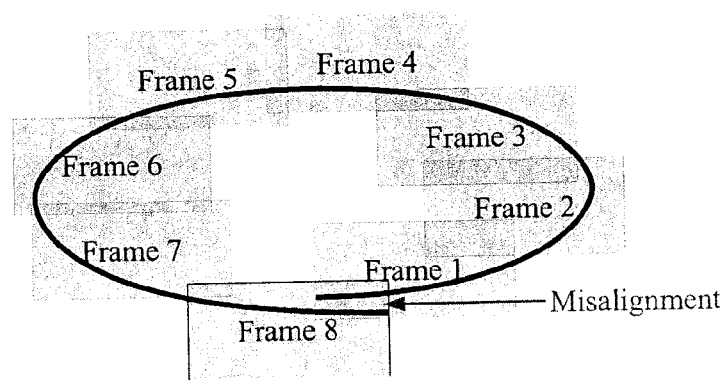
FIG. 5  Prior Art
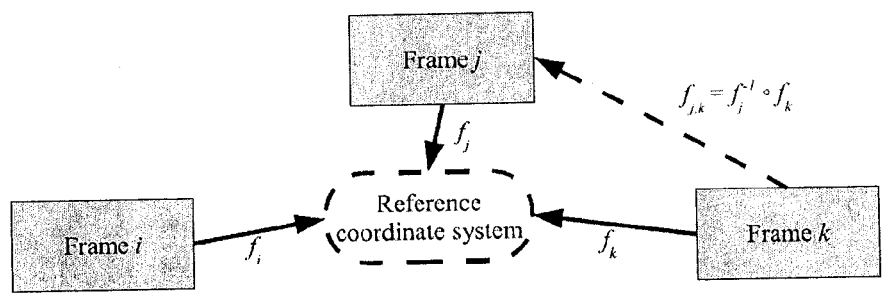
FIG. 6  Prior Art
FIG. 7
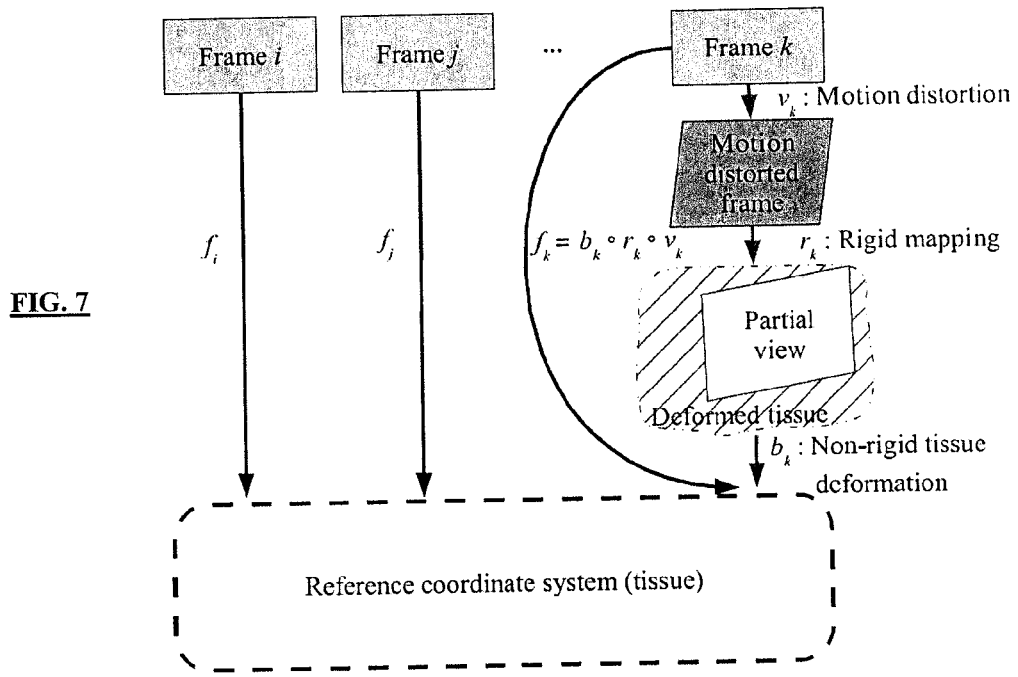

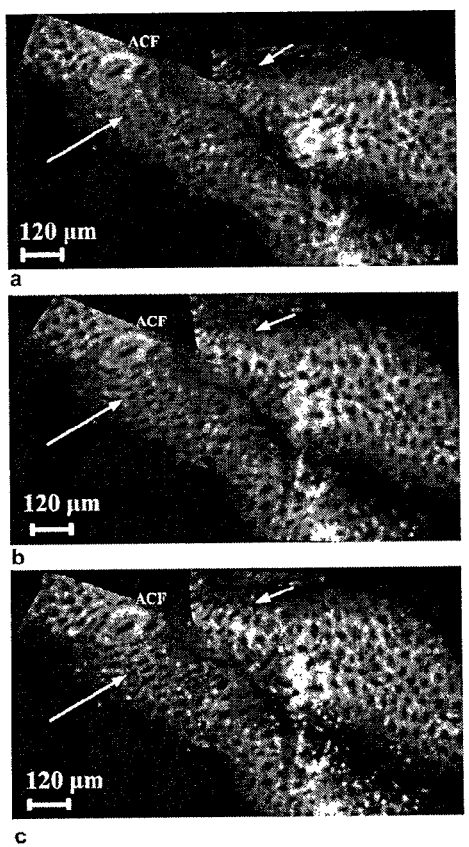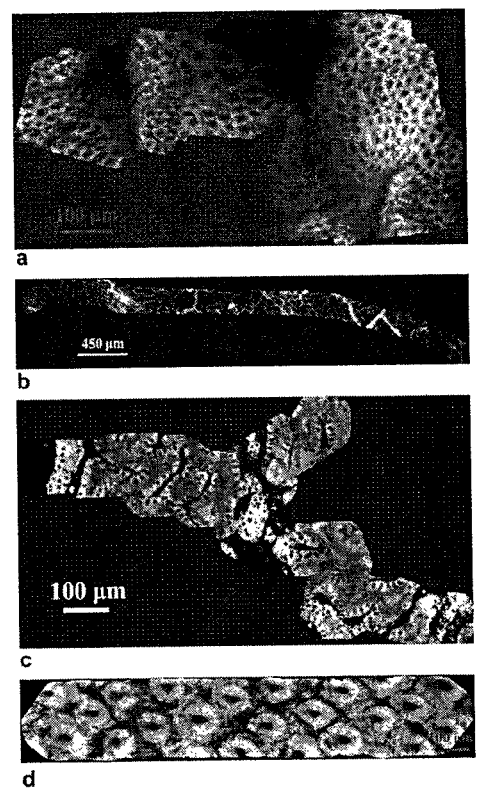
FIG. 19
FIG. 20

ROBUST MOSAICING METHOD, NOTABLY WITH CORRECTION OF MOTION DISTORTIONS AND TISSUE DEFORMATIONS FOR A VIVO FIBERED MICROSCOPY

BACKGROUND OF THE INVENTION

The present invention relates generally to mosaicing algorithm, and relates more particularly to a method for mosaicing frames from a video sequence acquired from a fibered confocal scanning device.

Fibered confocal microscopy (FCM) is based on the principle of confocal microscopy which is the ability to reject light from out-of-focus planes and provide a clear in-focus image of a thin section within the sample. This optical sectioning property is what makes the confocal microscope ideal for imaging thick biological samples. The adaptation of a fibered confocal microscope for in vivo and in situ imaging can be viewed as replacing the microscope objective by a flexible microprobe of adequate length and diameter in order to be able to perform in situ imaging. For such purpose, a flexible fiber bundle is used as the link between the scanning device and the miniaturized microscope objective (see FIG. 1). The Cellvizio©, developed by Mauna Kea Technologies (MKT), is a complete fibered confocal microscope with a lateral and axial resolution comparable with a standard confocal microscope. It is based on the combination of:

- a flexible optical microprobe consisting in a bundle of tens of thousands of fiber optics, whose overall dimensions are compatible with the accessory channel of a standard endoscope;
- a proximal laser scanning unit, which assembles the functions of light illumination, signal detection, and XY robust and rapid scanning;
- a control and acquisition software providing real-time image processing.

The laser scanning unit, performs a scanning of the proximal surface of the flexible optical microprobe with the laser source by using two mirrors. Horizontal line scanning is performed using a 4 kHz oscillating mirror while a galvanometric mirror performs frame scanning at 12 Hz. A custom synchronization hardware controls the mirrors and digitizes, synchronously with the scanning, the signal coming back from the tissue using a mono-pixel photodetector. When organized according to the scanning, the output of the FCM can be viewed as a raw image of the surface of the flexible image bundle. Scanning amplitude and signal sampling frequency have been adjusted to perform a spatial over-sampling of the image bundle. This is clearly visible on the raw image in FIG. 2 where one can see the individual fibers composing the bundle. A typical fiber bundle is composed of 30,000 fiber optics, with a fiber inter-core distance $d_{ic}$=3.3 µm, and a fiber core diameter of 1.9 µm. Fiber arrangement is locally quasi hexagonal, but does not show any particular order at larger scales.

Each fiber of the bundle provides one and only one sampling point on the tissue. Associated with these sampling points comes a signal that depends on the imaged tissue and on the single fiber characteristics. The role of the image processing is first to build a mapping between the FCM raw image and the fibers composing the image bundle. Once the mapping between the raw data and each individual fiber is obtained, characteristics of each fiber are measured and the effective signal coming back from the tissue is estimated.

The input of the mosaicing algorithm will therefore be composed of non-uniformly sampled frames where each sampling point corresponds to a center of a fiber in the flexible fiber bundle. A collection of typical frames acquired in vivo is shown in FIG. 3.

Fibered confocal microscopy (FCM) is a promising tool for in vivo and in situ optical biopsy. This imaging modality unveils in real-time the cellular structure of the observed tissue. However, as interesting as dynamic sequences may be during the time of the medical procedure or biological experiment, there is a need for the expert to get an efficient and complete representation of the entire imaged region. The goal of the present invention is to enhance the possibilities offered by FCM. Image sequence mosaicing techniques can be used to provide this efficient and complete representation and widen the field of view (FOV). Several possible applications are targeted. First of all, the rendering of wide-field micro-architectural information on a single image will help experts to interpret the acquired data. This representation will also make quantitative and statistical analysis possible on a wide field of view. Moreover, mosaicing for microscopic images is a mean of filling the gap between microscopic and macroscopic scales. It allows multi-modality and multi-scale information fusion for the positioning of the optical microprobe. FCM is a direct contact imaging technique. In order to image and explore a region of interest, the optical microprobe is glided along the soft tissue. The displacement of the optical microprobe across the tissue can be described by a rigid motion. Since FCM is a laser scanning device, an input frame does not represent a single point in time. In contrast, each sampling point corresponds to a different instant. This induces motion artifacts when the optical microprobe moves with respect to the imaged tissue. Furthermore, the interaction of the contact optical microprobe with the soft tissue creates additional small non-rigid deformations. Due to these non-linear deformations, motion artifacts and irregular sampling of the input frames, classical video mosaicing techniques need to be adapted.

However the invention has a broader scope because it can apply to non-fibered confocal scanning microscope or to any scanning device providing a video sequence.

Another aim of the present invention is to improve the gain in both noise level and resolution of input frames whatever the acquisition system used.

SUMMARY OF THE INVENTION

According to one aspect of this invention, a method for mosaicing frames from a video sequence acquired from a scanning device, each frame being constituted by a point cloud, comprises the steps of:
a) compensating for motion and motion distortion due to the scanning device, particularly in order to map all frames according to a common reference coordinate system,
b) applying a global optimisation of inter-frame registration to align consistently the frames,
c) applying a construction algorithm on the registered frames to construct a mosaic, and
d) applying a fine frame-to-mosaic non rigid registration.

Preferably, the frame motion speed is between zero and x*f mm/s, x being the imaged field of view diameter in mm, and f the frame rate in Hz (e.g. 6 mm/s for 0.5 mm field of view, at 12 Hz).

More precisely, the step a) comprises the steps of:
a1—applying a local pairwise rigid registration,
a2—estimating a set of globally consistent transformations by considering a least square criterion, and
a3—using linear transformation to correct motion distortions.

Steps a1, a2 and a3 constitute a first iteration loop, said first iteration loop being carried out three or four times. As a matter of fact, the number of iteration loop depends on the content of the video sequence; "three or four times" being a typical non limitative example.

During step a2, the least square criterion is applied to a transformation space which is a Lie Group.

According to another aspect of the invention, an estimation of transformation parameters is obtained by solving the following non linear least square equation:

$$[r_1^*, \ldots, r_N^*] = \arg\min_{[r_1,\ldots,r_N]} \frac{1}{2}\|\phi(r_1, \ldots, r_N)\|^2$$

where:

$$\phi(r_1, \ldots, r_N) = \text{Vect}(\{S_{ee} \cdot \log_{Id}(r_i^{-1} \circ r_j \circ r_{j,i}^{(obs)})\}_{(i,j)\in\Theta})$$

$S_{ee}$ is a matrix square root of $\Sigma_{ee}^{-1}$; $\Sigma_{ee}^{-1}$ being the covariance matrix of e, an error whose Fréchet mean is the identity;

$r_{j,i}^{(obs)}$ is the pairwise rigid registration result between the distortion corrected input frames i and j; this result being considered as a noisy observation of $r_j^{-1} \circ r_i$;

$\Theta$ is the set of all available pairwise rigid registration results.

According to yet another aspect of the invention, step c) comprises a discrete Shepard's like algorithm in which the value associated with each point in a chosen regular grid is given by:

$$\hat{I}(p) = \frac{\Sigma_k \rho_k i_k G(p - p_k)}{\Sigma_k \rho_k G(p - p_k)} = \frac{\lfloor G * \Sigma_k \rho_k i_k \delta_{pk}\rfloor(p)}{\lfloor G * \Sigma_k \rho_k \delta_{pk}\rfloor(p)}$$

where
($p_k$, $i_k$) is a set of sampling points and their associated signal,
$\delta_{pk}$ is a Dirac distribution centered at $p_k$,
$\rho_k$ is a factor, and
G is a Gaussian filter.

More precisely, step d) consists in a demons algorithm applied between each frame and the constructed mosaic from step c). In the case of a scanning microscope with flexible fibered microprobe, the demons algorithm can be modified:
  by using a fine reference grid to make a sparse grid from scattered point set representing the centers of fibers compositing the flexible microprobe;
  by modelling non-rigid deformations by a list of elementary displacements, one per fiber or demon; and
  in that the optical flow is computed for all demons, its computation requiring the gradient of a reference image which is a non-uniformly sampled input frame.

Advantageously, steps c) and d) constitute a second iteration loop. Preferably, the scanning device is a fibered confocal microscope using a bundle of several thousand of fiber optics.

In other words, the present invention is based on a hierarchical framework that is able to recover a globally consistent alignment of the input frames, to compensate for the motion-induced distortion of the input frames (simply called motion distortion hereafter) and to capture the non-rigid deformations. The global positioning is presented as an estimation problem on a Lie group. An efficient optimization scheme is proposed to solve this estimation problem. Because the motion distortions are induced by the motion of the optical microprobe, this relationship is modelled and used to recover the motion distortions. An efficient scattered data fitting method is also proposed to reconstruct on a regular grid the irregularly sampled images that arise from the inputs and from the mosaic construction process. This reconstruction method is also used when non-rigid deformations are recovered with an adapted demons algorithm.

BRIEF DESCRIPTION OF THE DRAWINGS

In order that the present invention may be more clearly ascertained, preferred embodiments of the present invention will now be described, by way of example, with reference to the accompanying drawings in which:

FIG. 5 is a schematic view of misalignment of frames according to the prior art, FIG. 6 depicts an overview of the global frame-to-reference transformations and the local frame-to-frame transformations, FIG. 7 depicts a schematic representation of the three-steps composing the global frame-to-reference transformations according to the present invention.

with constant angle velocity; (a) Mosaic using global frame positioning; (b) Estimated angle and fitted line, FIG. 19 illustrates mosaics of 50 in vivo mouse colon images after instillation of acriflavine (Courtesy of D. Vignjevic, S. Robine and D. Louvard, Institut Curie, Paris, France); The arrows point to zones of the mosaic where the visual gain is particularly appealing; (a) Mosaic using pairwise rigid registrations between consecutive frames; (b) Mosaic using global positioning and motion distortion compensation; (c) Mosaic using our complete algorithm (including non-rigid registration), FIG. 20 illustrates Pseudo-color mosaics of the colon. (a) Ex vivo mouse colon imaging after instillation of acriflavine (226 input frames). (Courtesy of D. Vignjevic, S. Robine and D. Louvard, Institut Curie, Paris, France). (b) In vivo Mouse colon vascularization after injection of FITC-Dextran high MW (300 input frames). (Courtesy of M. Booth, MGH, Boston, Mass.). (c) Ex vivo reflectance imaging of the human colon (1500 input frames). (d) Ex vivo imaging of the human colon with methylene blue (51 input frames). (Courtesy of P. Validire, Institut Mutualiste Montsouris, Paris, France), FIG. 3c); (b) Final mosaic (101 input frames); The dashed circle corresponds to the first input frame shown in FIG. 22a.

DETAILED DESCRIPTION OF THE INVENTION

Although the invention is not limited to this, the method according to the present invention implemented in a confocal microscope with laser scanning in fibre mode will now be described.

The scanning of the laser can be decomposed into a fast horizontal sinusoidal component and a slow linear uniform vertical component. Horizontally, the imaging is done only on the central part of the trajectory, where the spot velocity is maximal and nearly constant. Since in this part, the spot horizontal velocity $V_x$ (>5 m/s) is several orders of magnitude higher than the spot vertical velocity $V_y$ (~2 mm/s), we assume that the horizontal spot velocity is infinite.

An interesting point of scanning imaging devices is that the output image is not a representation of a given instant, but a juxtaposition of points acquired at different times. Consequently, if the flexible microprobe moves with respect to the imaged tissue, what we observe is not a frozen picture of the tissue, but a skewed image of it. Each scan line indeed relates to a different instant, and the flexible microprobe moved between each scan line.

Figure 4:
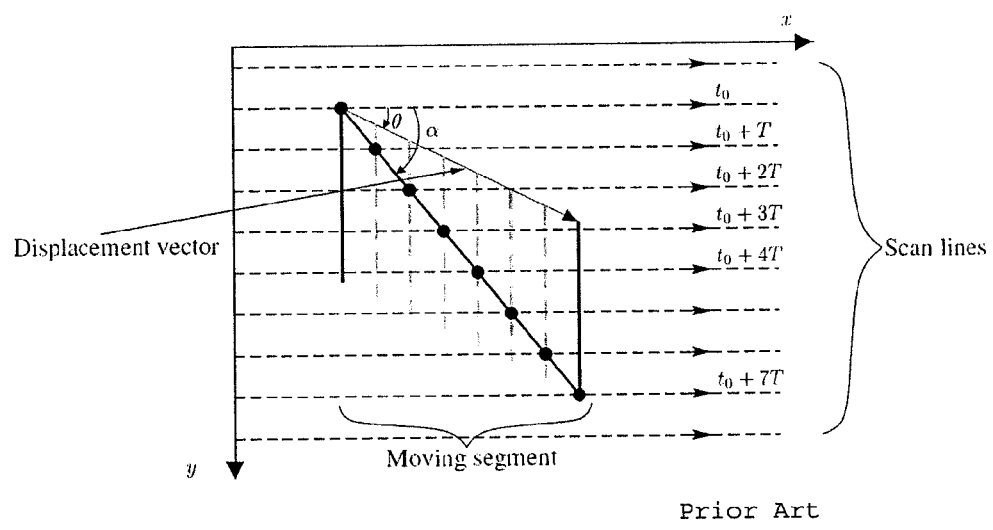
FIG. 4 depicts an imaging of a moving vertical segment by a scanning laser.

Considering a standard 2D+t volume, without scanning each acquired frame would correspond to a single time instant $t_0$ and thus to a 2D horizontal slice of the volume. With scanning a point of ordinate y corresponds to the time $t_0+y/V_y$. The process of image formation therefore comes down to imaging an oblique plane of the volume. FIG. 4 presents what will be observed when imaging a vertical segment moving with respect to the flexible microprobe. The segment has a translation movement from the upper left corner to the lower right corner of the image. The segment is first intersected by a scan line at instant $t_0$ (black disks represent imaged points). The following scan lines image the segment at different positions (dotted segments). The resulting shape is the slanting segment of angle α.

The goal of many existing mosaicing algorithms is to estimate the reference-to-frame mappings and use these estimates to construct the mosaic. Small residual misregistrations are then of little importance because the mosaic is reconstructed by segmenting the field into disjoint regions that use a single source image for the reconstruction. Even if these reconstruction techniques can ignore small local registration errors, a globally consistent alignment framework is needed to avoid large accumulated registration errors as shown in FIG. 5. Accumulated registration errors result in global misalignment. What should be an ellipse, appears like an open curve due to these errors.

Since input frames of the present invention are rather noisy, all the available information will be used to recover an approximation of the true underlying scene. The frame-to-reference transformations (instead of the usual reference-to-frame) will therefore be estimated and all the input sampling points as shifted sampling points of the mosaic will be considered. This has several advantages. First of all, this is really adapted to irregularly sampled input frames because we will always use the original sampling points and never interpolate the input data. This approach is also more consistent with a model of noise appearing on the observed frames rather than on the underlying truth. Finally in this framework, it will be possible to get a mosaic at a higher resolution than the input frames. The aim is to obtain an accurate estimate of the unknown transformations.

1.1. Observation Model

Each frame of the input sequence is modeled as a noisy and deformed partial view of a ground truth 2D scene (the mosaic we want to recover). Let I be the unknown underlying truth and $I_n$ be the observed frames. Each observed sampling point p in the coordinate system $\Omega_n$ associated with the nth input frame can be mapped to a point in the reference coordinate system $\Omega$ by the nth frame-to-reference mapping $f_n$. Each observed sampled value $I_n(p)$ can then be seen as a noisy observation of the ground truth signal $I(f_n(p))$:

$$I_n(p)=I(f_n(p))+\epsilon_n(p) \forall p \in \Omega_n \qquad (1)$$

where $\epsilon_n(p)$ is a noise term. Note that according to this observation model, we need to recover the frame-to-reference mappings as opposed to many existing mosaicing algorithms that estimate the reference-to-frame mappings (see FIG. 6).

We specifically designed our transformation model for fibered confocal microscopy. The displacement of the optical microprobe across the tissue can be described by a rigid shift denoted by $r_n$. Since FCM is a laser scanning device, this motion of the optical microprobe with respect to the imaged tissue induces some motion artifacts. These distortions can be modeled by a linear transformation $v_n$ that will be described in more details in Section 4. Finally, due to the interaction of the contact optical microprobe with the soft tissue, a small non-rigid deformation $b_n$ appears. The frame-to-reference mappings are thus modeled by:

$$f_n(p)=b_n \circ r_n \circ v_n(p). \qquad (2)$$

1.2. Overview of the Algorithm

As depicted in FIG. 7, our complete model of the frame-to-reference transformations is quite complex. A typical approach for dealing with the estimation of such complex models is to have a hierarchical, coarse-to-fine, approach. We will therefore focus on developing a method that iteratively refines the model while always keeping the global consistency of the estimated frame-to-reference transformations. The frame-to-reference mappings are composed of a motion-related distortion, a large rigid mapping and a small non-rigid deformation due to the soft tissue deformation.

We start by assuming that the motion distortions as well as the non-rigid tissue deformations can be ignored. By making the reasonable assumption that consecutive frames are overlapping, an initial estimate of the global rigid mappings can be obtained by using a rigid registration technique to estimate the motion between the consecutive frames. Global alignment is then obtained by composing the local motions. This initial estimate suffers from the well-known accumulation of error problem illustrated in FIG. 5. The first loop of our algorithm (steps 1, 2 and 3 in FIG. 8) alternates between three steps. The first step assumes that the motion distortions have been correctly estimated and registers pairs of distortion compensated frames under a rigid body transformation assumption.

The second step uses these local pairwise registration results to make a globally consistent estimation of the rigid mappings $r_n$. The third step uses the relationship between the motion and the motion distortions to provide an updated and consistent set of rigid mappings and motion compensations.

Once a globally consistent set of transformations is found, the algorithm constructs a point cloud by mapping all observed sampling points onto a common reference coordinate system. An efficient scattered data fitting technique is then used on this point cloud to construct an initial mosaic. The residual non-rigid deformations are finally taken into account by iteratively registering an input frame to the mosaic and updating the mosaic based on the new estimate of the frame-to-mosaic mapping.

In step 2 of our algorithm, we use all available pairwise rigid registration results to estimate a set of globally consistent transformations. A sound choice is to consider a least-square approach. However, the space of rigid body transformations is not a vector space but rather a Lie group that can be considered as a Riemannian manifold.

2. Basic Tools for Estimation Problems on Lie Groups

Many sets of primitives used in image processing and computer vision can be considered as real Lie Groups or as quotients of real Lie groups (e.g. 2D rigid body transformations, tensors (Pennec et al., 2006), quaternions, upper triangular matrices, M-reps. Most of them are not vector spaces and paradoxes such as Bertrand's paradox appear when one considers a Lie Group as a vector space within an estimation problem.

The goal of this section is to provide a basic toolbox for estimation problems on real Lie groups. This synthesis uses classical tools from differential geometry and focuses on Lie groups to simplify the results and notations. Detailed treatment of differential geometry and Lie groups can be found in textbooks. By using differential geometry, we will be able to generalize many algorithms designed for the usual vector space case.

A Lie Group G is a smooth manifold together with a smooth composition map (usually denoted as multiplication) and a smooth inverse map that satisfy the group axioms: closure, associativity, existence of a neutral element (denoted hereafter as Id) and existence of an inverse. Two important mappings for us are the left-compositions and right-compositions by an element m:

$$L_m : x \in G \mapsto L_m(x) = m \circ x \in G,$$

$$R_m : x \in G \mapsto R_m(x) = x \circ m \in G.$$

They are diffeomorphisms by definition. Hence they naturally induce the following differential maps (in a particular local coordinate system or chart):

$$DL_m(x) : u \in T_x G \mapsto DL_m(x) \cdot u = \left. \frac{\partial m \cdot y}{\partial y} \right|_{y=x} \cdot u \in T_{m \circ x} G,$$

$$DR_m(x) : u \in T_x G \mapsto DR_m(x) \cdot u = \left. \frac{\partial y \cdot m}{\partial y} \right|_{y=x} \cdot u \in T_{x \circ m} G,$$

which allow us to map the space $T_x G$ of tangent vectors to G at x to its counterpart $T_{m \circ x} G$ or $T_{x \circ m} G$.

2.1. Left Invariant Metric and Distance.

Because many estimation problems involve a measure of discrepancy between two elements, it is natural to look for a definition of a distance between two elements of a Lie group. This can be done by providing the Lie group with a Riemannian metric which is a continuous collection of dot products on the tangent space $T_x(G)$ at x: $\langle v|w \rangle_x = v^T \cdot G(x) \cdot w$. Because of the smoothness of the Lie Group, we can smoothly translate a dot product at the Id-tangent space to any other tangent space by left or right composition thanks to the differential maps above.

In the sequel we focus on left invariant metrics. Thanks to the left-composition differential map $DL_x$, they can be represented by the matrix field, $$G(x) = DL_x(Id)^{-T} \cdot G(Id) \cdot DL_x(Id)^{-1}. \qquad (3)$$

The Riemannian metric provides the intrinsic way of measuring the length of any smooth curve on the Lie group. The distance between two points of a Lie Group is then the minimum length among the curves joining these points. The curves realizing this minimum for any two points of the manifold are called geodesics. The calculus of variation shows that the geodesics follow a second order differential system depending on the Riemannian metric. Therefore, we know that there exists one and only one geodesic $\gamma_{(x,u)}(\cdot)$ defined for all times (thanks to the left-invariance), going through x at time t=0 and having u as a tangent vector.

2.2. Riemannian Exponential and Log Maps.

A key notion of differential geometry is the exponential map. Let us consider a given point x of the Lie group, a vector u in the corresponding tangent space and the uniquely associated geodesic $\gamma_{(x,u)}$. The exponential map is the function that maps u to the point $\gamma_{(x,u)}(1)$ reached after a unit time by the geodesic:

$$\exp_x : \begin{cases} T_x(G) \to G \\ u \mapsto \exp_x(u) = \gamma_{(x,u)}(1) \end{cases}$$

Figure 9:
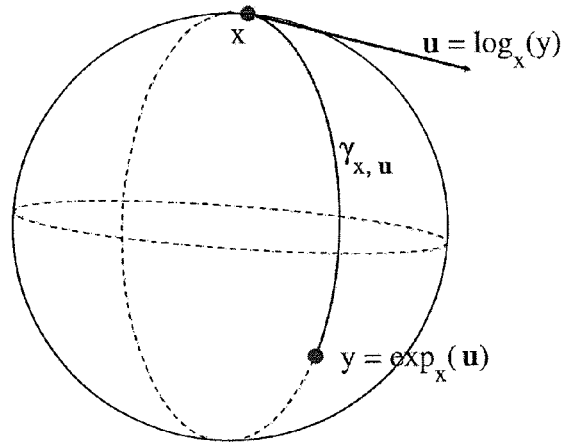
FIG. 9 depicts Riemannian exponential and log maps on a unit sphere.

This function realizes a local diffeomorphism from a neighbourhood of 0 to a neighborhood of x by developing the tangent space along the geodesics (see FIG. 9). Within this neighborhood, the inverse of the exponential map exists and is called the log map $\log_x(\cdot)$:

$$\exp_x u = y \Leftrightarrow u = \log_x y.$$

In the context of Lie groups, the exponential map notion can be ambiguous as one can use the Lie group exponential or the Riemannian manifold one. Both definitions agree if and only if the Lie group admits a left-and-right-invariant Riemannian metric (such as for compact Lie groups) used to define the geodesics. Unfortunately, for the group of rigid body transformations, it can be shown that no bi-invariant metric exists. In the context of estimation problems, we are mainly interested in distance measurements and we will therefore stick to the Riemannian exponential. When a left-invariant metric is used, the exponential and log maps at any point of a Lie group can be related through left composition to their counterpart at the identity with the following equations:

$$\log_x(y) = DL_x(Id)\log_{Id}(x^{-1} \circ y), \quad (4)$$

$$\exp_x(u) = x \circ \exp_{Id}(DL_x(Id)^{-1} u). \quad (5)$$

With the log map, the (geodesic) distance between two points is given by:

$$dist(x, y) = dist(Id, x^{-1} \cdot y) = \|\log_{Id}(x^{-1} \cdot y)\| \quad (6)$$
$$= \langle \log_{Id}(x^{-1} \cdot y) \mid \log_{Id}(x^{-1} \cdot y) \rangle^{1/2}.$$

As shown above, we see that even if we mainly use the Lie group as a Riemannian manifold, its additional structure is of great practical interest because it allows us to map every tangent space to the one at the identity. We therefore only need to have computational tools for one tangent space, the tangent space at the identity.

2.3. Mean and Covariance Matrix

Lie groups are usually not vector spaces, and the notion of expectation can not readily be extended to it. However, for any metric space, it is possible to define probabilistic spaces, random elements and probability density functions. Expectations and other usual tools are then defined for random variables, which are real-valued functions of the probabilistic events, but not directly for random elements of the group. However, by changing the definition of the expectation and using the Riemannian geometry tools presented in Section 2.2, it turns out that a consistent statistical framework (including the mean, the covariance and the Mahalanobis distance) can be defined.

In a vector space, the mean can be seen as the element that minimizes the expected distance to a random vector. This point of view allows us to generalize the mean for Lie groups. Let x be a random element and let $$\sigma_x^2(y) = E[dist(y,x)^2]$$

be its variance at the (fixed) element y. Note that this is well defined because $dist(y, \cdot)$ is a real-valued function.

Let x be a random element of a Lie group G. If the variance $\sigma_x^2(y)$ is finite for all elements $y \in G$, every element minimizing the variance is called a Fréchet mean element.

The set of Fréchet mean elements is thus given by $$\mathfrak{I}_x = \underset{y \in G}{\mathrm{argmin}}(E[dist(y, x)^2]). \quad (7)$$

It can be shown that under suitable conditions (that are assumed to be fulfilled here), there exists one and only one Fréchet mean which we denote as E[x].

To define higher moments of a distribution, on a Lie group, the exponential map at the mean point is used. The random feature is thus represented as a random vector with zero mean in a star-shaped domain. With this representation, the covariance matrix can be defined by:

$$\sum_{xx} = E[\log_{E[x]}(x) \cdot \log_{E[x]}(x)^T] \quad (8)$$
$$= DL_m(E[x]) \cdot$$
$$E[\log_{Id}(E[x]^{-1} \circ x) \cdot \log_{Id}(E[x]^{-1} \cdot x)^T] \cdot$$
$$DL_m(E[x])^T.$$

The Mahalanobis distance, which plays a key role to get a robust estimation of the global positioning, can be defined. The Mahalanobis distance is a classical tool to define a statistical distance in a sample space with known covariance matrix. Its definition can easily be extended to Lie groups by using the above definition of the covariance matrix. The Mahalanobis distance of a point y to a random feature with Fréchet mean E[x] and covariance matrix $\Sigma_{xx}$ is given by $$\mu_x^2(y) = \log_{E[x]}(y)^T \Sigma_{xx}^{-1} \log_{E[x]}(y). \quad (9)$$

3. From Local to Global Alignment

Now, we will show how the problem of global positioning can be cast to an estimation problems on a Lie group. The first step of our algorithm is to find a globally consistent set of transformations to map the input frames to a common coordinate system. When the input frames arise from a single gliding of the flexible microprobe along a straight line, it may be possible to generate decent alignments by computing only pairwise registrations between the consecutive frames.

Figure 1:
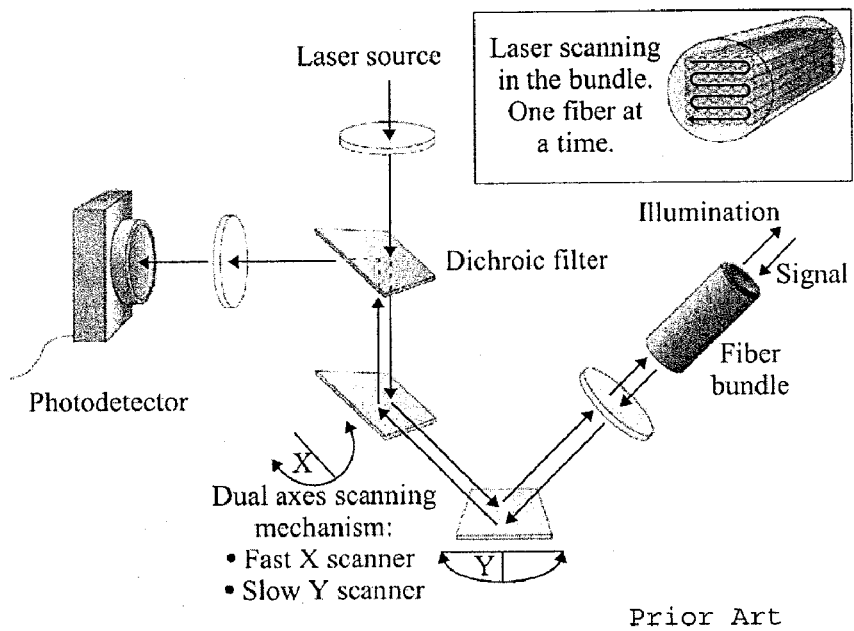
FIG. 1 is a schematic view of principle of fibered confocal microscopy.
Figure 2:
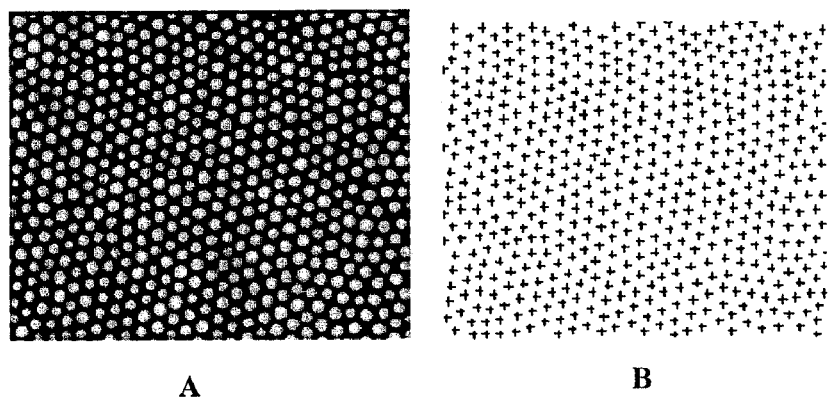
FIG. 2 depicts a portion of a raw image (A) of a constant signal and corresponding fiber centers (B)
Figure 3:
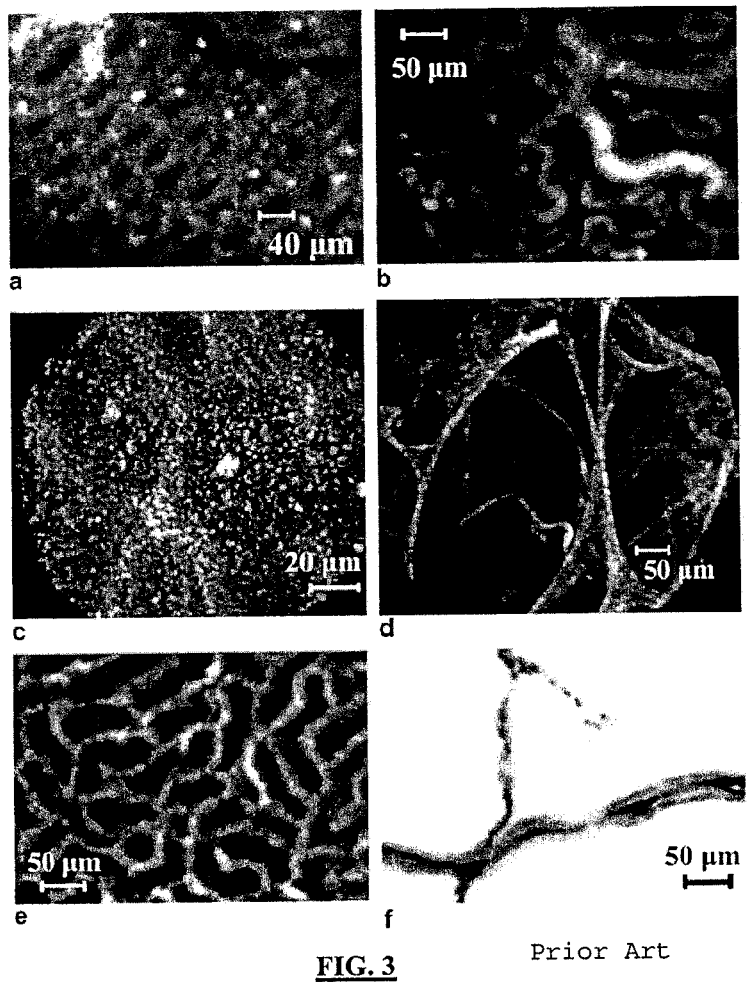
FIG. 3 illustrates different types of images acquired with the Cellvizio© (a) In vivo mouse colon after instillation of acriflavine (Courtesy of D. Vignjevic, S. Robine, D. Louvard, Institut Curie, Paris, France). (b) In vivo tumoral angiogenesis in mouse with FITC-Dextran high MW (Courtesy of A. Duconseille and O. Clément, Descartes Image, Université Paris V, Paris, France). (c) In vivo reflectance imaging of human mouth mucosa. (d) Ex vivo Autofluorescence imaging in human lung (Courtesy of Dr. P. Validire, Institut Mutualiste Monsouris, Paris, France). (e) Microcirculation of the peritubular capillaries of a live mouse kidney with FITC-Dextran high MW. (f) Dendritic receptors in a live Thy1-YFP mouse (Courtesy of I. Charvet, P. Meda, CMU, Geneva, Switzerland and L. Stoppini, Biocell Interface, Geneva, Switzerland)

However in the general case, all spatial neighbors frames might not be temporal neighbors, and accumulated errors can lead to a poor global alignment as shown in FIG. 5. Methods for producing globally consistent alignments are therefore needed. The automatic multi-image alignment algorithms developed so far broadly fall into two categories: feature based and local to global methods (Sawhney et al., 1998). Feature-based methods obviously rely on features extraction from the input frames. In order to get meaningful extracted information, the chosen features are often tailored to the types of images that are to be mosaiced (e.g. panoramas, retinal fundus images, aerial views, etc.) and have been developed for classical uniformly sampled images. We want an algorithm that is able to cope with non-uniformly sampled inputs (possibly very noisy) arising from many different types of tissue, as shown in FIG. 3. We therefore chose to develop a method using local pairwise alignments to generate consistent global mappings.

3.1. Framework for Global Positioning

Given two input frames, we need to estimate the (pairwise) frame-to-frame transformation.

At this step of the algorithm, we assume that the nonrigid tissue deformations can be ignored and that the motion distortions have been correctly estimated. With these assumptions, we need to perform rigid registrations of distortion corrected input frames. For that purpose, we use a classical registration framework based on a similarity criterion optimization but any other technique can be used. Let $r_{j,i}^{(obs)}$ be the pairwise rigid registration result between the distortion corrected input frames i and j. This result is considered as a noisy observation of $r_j^{-1} \circ r_i$. Based on the set of all available observations, our algorithm looks for a globally consistent estimate of the global parameters $r_1, \ldots, r_N$. In Sawhney et al. (1998), the authors propose a more general approach. Some chosen corner points are transformed through $r_i$ and $r_j \circ r_{j,i}^{(obs)}$. The squared distance between the transformed points added to a regularization term is then minimized. These techniques are sensitive to outliers, and are either tailored to a specific type of transformation or need a somewhat ad hoc choice of points. In this paper, we chose to rely on the tools presented in Section 2 in order to provide consistent and robust estimates of the global rigid body transformations. Practical instantiations of the generic tools presented in Section 2 are given, for 2D rigid body transformations, in the Appendix. The computational cost of registering all input frames pairs is prohibitive and not all pairs of input frames are overlapping. It is therefore necessary to choose which pairs could provide informative registration results. For that purpose, we chose the topology refinement approach proposed in Sawhney et al. (1998). An initial guess of the global parameters $r_1, \ldots, r_N$ is obtained by registering the consecutive frames, the algorithm then iteratively chooses a next pair of input frames to register (thus providing a new observation $r_{j,i}^{(obs)}$ and updates the global parameters estimation. As we only consider the pairwise registration results as noisy observations, we need many of them. In order to minimize the computational cost of those numerous registrations, we use a multiresolution registration technique using a Gaussian image pyramid that stops at a coarse level of the optimization.

3.2. A Lie Group Approach for Global Positioning.

Let e be a random error whose Fréchet mean is the identity and whose covariance matrix is $\Sigma_{ee}$. The observation model is given by:

$$r_{j,i}^{(obs)} = r_j^{-1} \circ r_i \circ e_{j,i}^{(obs)} \quad (10)$$

where $e_{j,i}^{(obs)}$ is a realization of the random error e.

Given the set of all available pairwise rigid registration results $\Theta$, we need to estimate the true transformations. A natural choice is to minimize the statistical distance (i.e. Mahalanobis distance) between the observations $r_{j,i}^{(obs)}$ and the transformations $r_j^{-1} \circ r_i$ predicted by our model. Our global criterion is thus given by:

$$[r_1^*, \ldots, r_N^*] = \arg\min_{[r_1, \ldots, r_N]} \frac{1}{2} \sum_{(i,j) \in \Theta} \mu_e^2(e_{j,i}^{(obs)}). \quad (11)$$

It can be seen that this criterion is insensitive to a composition of all transformations with a fixed arbitrary transformation. We can therefore choose any transformation in $r_1, \ldots, r_N$ to be the identity transformation Id. Without loss of generality we can look for any minimizer in (11) and then compose all estimates with a common rigid body transformation so that we get for example $$r_{[\frac{N}{2}]} = Id.$$

The covariance matrix used for the Mahalanobis metric depends on the application. We typically start with a diagonal matrix that weights the angles with respect to the translation. This matrix can further be estimated from the data as explained in Section 3.3.

According to (9), each term of the sum in (11) is given by:

$$\mu_e^2(e_{j,i}^{(obs)}) = \log_{Id}(e_{j,i}^{(obs)})^T \sum_{ee}^{-1} \log_{Id}(e_{j,i}^{(obs)}).$$

$$= \|S_{ee} \cdot \log_{Id}(r_i^{-1} \cdot r_j \cdot r_{j,i}^{(obs)})\|^2$$

where $S_{ee}$ is a matrix square root (e.g. Cholesky factorization) of $\Sigma_{ee}^{-1}$. We see that we need to solve the non-linear least squares problem:

$$[r_1^*, \ldots, r_N^*] = \arg\min_{[r_1, \ldots, r_N]} \frac{1}{2} \|\phi(r_1, \ldots, r_N)\|^2,$$

where:

$$\phi(r_1, \ldots, r_N) = \text{Vect}(\{S_{ee} \cdot \log_{Id}(r_i^{-1} \circ r_j \circ r_{j,i}^{(obs)})\}_{(i,j) \in \Theta}).$$

Note that this criterion is indeed non-linear because of the composition involved in the computation of $e_{j,i}^{(obs)}$.

3.3. Method for Non-Linear Least Squares Problems on Lie Groups

Many usual optimization algorithms work by making a series of straight steps towards the optimum. Most often, it first looks for a walking direction and then finds a step length according to a predefined rule (e.g. Gauss-Newton) or by using a line search technique (e.g. conjugate gradient). In our Lie group framework, the straightest paths are given by the geodesics. The idea is thus to walk towards an optimum by a series of steps taken along a geodesic of the Lie group rather than walking in the tangent vector space (i.e. using a usual optimization routine on the representation of the elements).

Thanks to the exponential map, we have a canonical way to follow a geodesic starting from a given point and having a given initial tangent vector. It is thus possible to combine the power of intrinsic geodesic walking and the ease of use of classical optimization routines in a natural way.

The Gauss-Newton method forms the basis for the efficient methods that have been developed for non-linear least squares optimization. We now show how it can be used in the Lie group setting. Let x be an element of a Lie group G and let $$\frac{1}{2}\|\phi(x)\|^2$$

be the function we want to minimize. The Gauss-Newton method is based on a linear approximation of $\phi(\cdot)$ in a neighborhood of the current estimate. We denote by $\phi_x(\cdot) = \phi(\exp_x(\cdot))$ the expression of $\phi(\cdot)$ in a normal coordinate system at x. Its Taylor expansion around the origin of this chart is given by:

$$\phi_x(v) = \phi_x(0) + J_\phi(x) \cdot v + O(\|v\|^2),$$

where $$J_\phi(x) = \frac{\partial \phi(y)}{\partial y}\bigg|_{y=x}.$$

By keeping only the linear part we get the following approximation:

$$\frac{1}{2}\|\phi_x(v)\|^2 \approx \frac{1}{2}\|\phi_x(v)\|^2 + v^T \cdot J_\phi(x)^T \cdot \phi(x) + \frac{1}{2}v^T \cdot J_\phi(x)^T \cdot J_\phi(x) \cdot v.$$

The Gauss-Newton step minimizes this approximation:

$$v_{gn} = \arg\min_v \left[ v^T \cdot J_\phi(x)^T \cdot \phi(x) + \frac{1}{2}v^T \cdot J_\phi(x)^T \cdot J_\phi(x) \cdot v \right].$$

It is well known that if $J_\phi(x)$ has full rank, this has a unique minimizer which is the solution of $J_\phi(x)^T \cdot J_\phi(x) \cdot v = -J_\phi(x)^T \phi (r_{1:N})$.

Our optimization routine now follows the geodesic starting from the current estimate $x^{(old)}$ and whose tangent vector is $v_{gn}$. We thus get the following update equation:

$$x^{(new)} = \exp_{x^{(old)}}(\lambda v_{gn}) \quad (12)$$

$$= x^{(old)} \cdot \exp_{Id}(\lambda DL^{-1}_{x^{(old)}}(Id) \cdot v_{gn}).$$

The classical Gauss-Newton routine uses $\lambda=1$ at all steps, but a line search could also be used.

We have shown how to adapt the Gauss-Newton procedure for a non-linear least squares problem on a Lie group.

A very similar approach would also provide extensions of other classical non-linear least squares optimizers (such as the Levenberg-Marquardt method or Powell's dog leg method) for Lie groups.

This method is applied to solve (11), where the Lie group we use is the Cartesian product of N rigid body transformation groups. The Jacobian $J_\phi[(r_1, \ldots, r_N)]$ can easily be computed by seeing that:

$$\frac{\partial \log_{Id}(r_i^{-1} \cdot r_j \cdot r_{j,i}^{(obs)})}{\partial r_i} = DR_{r_j \circ r_{j,i}^{(obs)}}(r_i^{-1}) \cdot DInv(r_i),$$

$$\frac{\partial \log_{Id}(r_i^{-1} \cdot r_j \cdot r_{j,i}^{(obs)})}{\partial r_j} = DR_{r_{j,i}^{(obs)}}(r_i^{-1} \circ r_j) \cdot DL_{r_i^{-1}}^{-1}(r_j),$$

where $$DInv(r) = \frac{\partial s^{-1}}{\partial s}\bigg|_{s=r}.$$

Within this general framework, several improvements can easily be added. In order to make the rigid registration between the distortion corrected input frames, we chose to optimize the squared correlation coefficient. It is then straightforward to weight the terms of the cost function (11) by this confidence measure. A well-known problem of pure least squares approach is the sensitivity of the solution to outliers in the observations. Many solutions have been proposed to handle the presence of outliers. The most common ones rely on using only a subset of the observations (e.g. least trimmed squares, reweighted least squares) or on a minimization of the sum of a function of the residuals (e.g. M-estimators).

In order to be able to use the efficient least-squares optimizer presented above, the easiest is to use the first approach or to solve the M-estimator problem using iteratively reweighted least squares.

In our particular setting we chose the simple reweighted least squares approach:

$$[r_1^*, \ldots, r_N^*] = \arg\min_{[r_1, \ldots, r_N]} \frac{1}{2} \sum_{(i,j) \in \Theta} w_{j,i} \cdot \rho_{j,i} \cdot \mu_e^2(e_{j,i}^{(obs)}),$$

$$w_{j,i} = \begin{cases} 1 & \text{if } \mu_e^2(\cdot) \leq \gamma \\ 0 & \text{otherwise,} \end{cases}$$

where $\rho_{j,i}$ is the correlation coefficient between the registered distortion corrected frames i and j, and $\gamma$ is the 95% quantile of the $\chi^2$ distribution with 3 degrees of freedom. If enough observations are available, our procedure also includes an estimation of the covariance matrix $\Sigma_{ee}$.

4. Compensating the Frame Distortions 4.1. Motion Distortions

We have shown that when using a laser scanning device, the relative motion of the imaged object with respect to the acquisition device induces distortions. Without any further assumption, these distortions can have a very general form. This can for example be seen in some famous photographs by Henri Lartigue or Robert Doisneau shot with a slit-scan camera. In our particular case, the main relative motion is due to the gliding of the flexible microprobe along the tissue and some residual movements can be produced by the deformation of the soft tissue.

We again use a hierarchical approach and ignore the effect of the tissue deformation. We thus face the problem of recovering the gliding motion of the flexible microprobe.

This motion will typically be smooth and will mainly be composed of a translation part because of an important torsion resistance of the flexible microprobe. Note that even if consecutive frames can only be slightly rotated, more time distant frames can have a large rotational difference. In order to be able to robustly recover the gliding motion, we need to further constrain it. We will therefore assume that during the time period $T_{scan}$ taken by the laser to scan a complete input frame, the flexible microprobe is only animated with a translational motion with constant velocity vector $\vec{\eta} = [\bar{\eta}^x, \bar{\eta}^y]$.

Let p=[x,y] be a point in the coordinate system related to the input frame. As shown before, each laser scan line, indexed by the ordinate y of a point, corresponds to a different time instant $$t(y) = t(0) + \frac{y}{V_y},$$

where we recall that $V_y$ is the vertical velocity of the laser scanning process. The point p will therefore be shifted by (t(y)−t(0)).

$$\tilde{\eta} = \frac{y}{V_y}\bar{\eta}$$

with respect to the center of the coordinate system. In order to simplify the notations, we will from now on use the normalized velocity $$\eta = \frac{1}{V_y}\bar{\eta}.$$

We now have a way to map a point p of an input frame to a point $p_d$ in the corresponding distortion compensated frame by using the following linear transformation:

$$P_d = \begin{bmatrix} 1 & \eta^x \\ 0 & 1+\eta^y \end{bmatrix} p = M(\eta) \cdot p. \tag{13}$$

Figure 10:
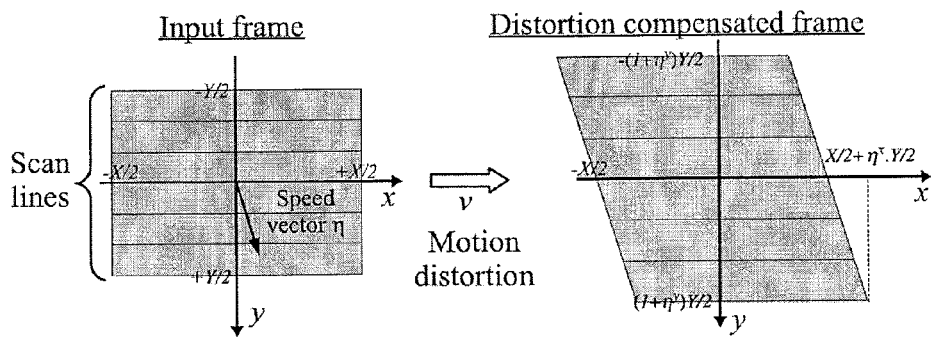
FIG. 10 depicts a schematic representation of the motion distortion with a constant translational velocity.

This is the explicit expression for the motion distortion transformations, i.e. $v_k(p)=M(\eta)\cdot p$ for a given frame k (see FIG. 10).

From this distortion model, we can derive the transformation model mapping an input frame k to another frame j. With the assumptions that the non-rigid deformations can be ignored, we have $f_j=r_j\circ v_j$, $f_k=r_k\circ v_k$ and $f_{j,k}=f_j^{-1}\circ f_k$, where we recall that fn denotes a global frame-to-reference mapping. This implies that:

$$f_{j,k}=v_j^{-1}\circ r_j^{-1}\circ r_k\circ v_k=v_j^{-1}\circ r_{j,k}\circ v_k \tag{14}$$

In the local-to-global positioning scheme presented in Section 3, we mentioned that we needed to perform rigid registrations of distortion compensated frames. By using (14), we see that it is possible to make these registrations without the need to explicitly create the motion compensated frames. We simply look for the best rigid body transformation $r_{j,k}$ while keeping $v_k$ and $v_j$ fixed.

4.2. Velocity Computation

In order to recover the motion distortions, one could try to register the frames using the complete transformation model (14). However, this would imply to ignore the relationship between positions and velocity and would thus not really be robust. We therefore chose to compute the velocities using the displacements information only.

Using finite difference equations, we can relate the global positioning and the velocity η. Since our motion model ignores the rotational velocity, we can focus on the displacement of the center of the flexible microprobe. Let r=[θ,τ] be the rigid mapping between two consecutive distortion compensated input frames. The center [0,0] of the first distortion compensated frame is mapped through r to the point τ in the second motion distortion compensated frame. The displacement of the center of the flexible microprobe during the corresponding interframe time period $T_{frame}$ is thus given by τ. By using a forward difference equation to relate the speed vector and the displacement vector, we get:

$$\eta = \frac{1}{V_y} \cdot \frac{1}{T_{frame}} \cdot \tau \tag{15}$$

Now let us assume that, with the current estimates of the rigid mapping $r^{(old)}$ and velocity $\eta^{(old)}$, the two consecutive input frames are correctly aligned. By using (14), we see that the center [0,0] of the first (uncompensated) input frame is mapped to the point $q=M(\eta^{(old)})^{-1}\cdot\tau^{(old)}$ in the (uncompensated) second input frame. Let $r^{(new)}$ and $n^{(new)}$ be the updated rigid mapping and velocity. In order to keep a correct alignment, the center of the first (uncompensated) input frame should still be mapped to the point q in the (uncompensated) second input frame. We therefore need to have:

$$M(\eta^{(new)})^{-1}\cdot\tau^{(new)}=M(\eta^{(old)})^{-1}\cdot\tau^{(old)} \tag{16}$$

On the other hand, according to (15), we should have $$\eta^{(new)} = \frac{1}{V_y} \cdot \frac{1}{T_{frame}} \cdot \tau^{(new)} \tag{17}$$

Figure 8:
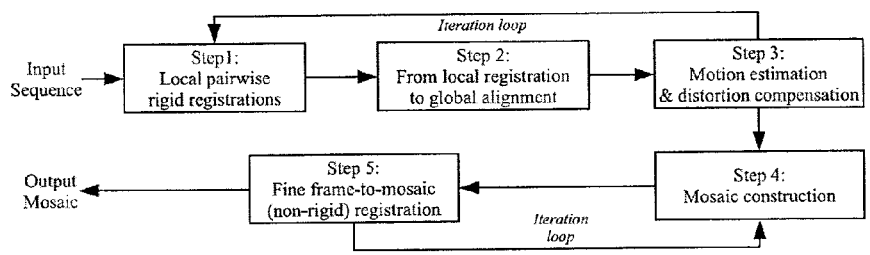
FIG. 8 illustrates a block diagram of the mosaicing algorithm according to the present invention.

The above system is solved to get updated estimations. A similar procedure is used with the backward difference equation and the different estimations are averaged to get the final update. As shown in FIG. 8, our algorithm iterates between a global positioning scheme during which the velocities are assumed to be correctly estimated and the above motion distortion compensation routine. The final step should be a global positioning one because a typical user will be sensitive to some slight misalignment but not to a slight inconsistency in the motion distortion.

4.3. Soft Tissue Deformations

Once a globally consistent, motion compensated, mosaic has been constructed, it is possible to make a refined multi-image registration by iteratively registering each input frame to the mosaic and updating the mosaic. The mosaicing problem can be written as an optimization problem over the unknown underlying image I and the unknown transformations $[f_1, \ldots, f_N]$ of the following multi-image criterion, $$S(f_1, \ldots, f_N, I) = \sum_{n=1}^{N} S(I_n, I\circ f_n),$$

where $S(I_a, I_b)$ is a usual pairwise similarity criterion between the two images $I_a$ and $I_b$. With this framework our mosaic refinement procedure can be seen as an alternate optimization scheme.

We again use a hierarchical approach and divide the fine frame-to-mosaic registrations into two loops of increasing model complexity. First we refine the global linear mappings. Then, in order to account for the small non-rigid deformations, we have adapted the demons algorithm (Thirion, 1998) to our special case of irregularly sampled input frames. The general demons is scheme is modified as follows:

- A fine reference grid is used to make a sparse grid $\Gamma_s$ from the scattered point set representing the centers of the fibers composing the flexible microprobe. All pixels of $\Gamma_s$ are selected in the input frame k to be demons.
- The non-rigid deformations $b_k$ is modeled by a list of elementary displacements (one per fiber or demon).
- In order to get a regular displacement field, the sparse displacement field, is smoothed at each iteration by using the scattered data approximation method that will be presented in Section 5 (with a large smoothing factor).

The optical flow is computed for all demons. Its computation requires the gradient of the reference image which in our case is a non-uniformly sampled input frame. In order to get an approximation of this gradient, we reconstruct the non-uniformly sampled input frame on a regular grid using the scattered data approximation method that will be presented in Section 5. We then use the gradient of this reconstruction.

We mainly used the above scheme because of its efficiency and its adaptation to our particular data, but other schemes could also be used. The residual deformation fields [$b_1, \ldots, b_N$] could be modeled by using B-splines tensor products on a predefined grid. The framework can also easily be extended to use any other non-rigid registration methods using landmarks based schemes or more accurate deformation models.

5. Efficient Scattered Data Approximation

The iterative mosaic refinement scheme presented in Section 4.3 requires a new mosaic construction at each iteration. Furthermore, the adapted demons algorithm needs a method for smoothing deformation fields that are defined on a sparse grid, together with a method being able to construct a regularly sampled image from an irregularly sampled input. These goals can be achieved with a single method for scattered data approximation provided that it allows us to control the degree of smoothness of the reconstruction. If we want to register the input frames with the mosaic, controlling the smoothness of the reconstruction is also important. We indeed need a mosaic that is smooth enough for the registration process not to be trapped in a local minimum but detailed enough for the registration result to be accurate.

As appears above, the scattered data approximation method will be used many times. It is therefore necessary to use a very efficient algorithm.

The usual algorithms for scattered data interpolation or approximation, such as triangulation based methods, Kriging methods, radial basis functions interpolations, B-Spline approximations or moving least squares methods (see e.g. Amidror, 2002) do not simultaneously meet the requirements of efficiency, and control over the smoothness of the approximation. In the sequel we develop a main contribution which is an efficient scattered data fitting algorithm that allows a control over the smoothness of the reconstruction.

5.1. Discrete Shepard's Like Method

Let $\{(p_k, i_k) \in \Omega \times R\}$ be the set of sampling points and their associated signal. Our goal is to get an approximation of the underlying function on a regular grid $\Gamma$ defined in $\Omega$.

The main idea is to use a method close to Shepard's interpolation. The value associated with a point in $\Gamma$ is a weighted average of the nearby sampled values, $$\hat{\imath}(p) = \sum_k w_k(p) i_k = \sum_k \frac{h_k(p)}{\Sigma_l h_l(p)} i_k. \quad (18)$$

The usual choice is to take weights that are the inverse of the distance, $h_k(p) = \text{dist}(p, p_k)^{-1}$. In such a case we get a true interpolation (Amidror, 2002). An approximation is obtained if a bounded weighting function $h_k(p)$ is chosen.

We choose a Gaussian weight $h_k(p) = G(p - p_k) \propto \exp(-\|p - p_k\|^2 / 2\sigma_a^2)$ and (16) can thus be rewritten as $$\hat{\imath}(p) = \frac{\Sigma_k i_k G(p - p_k)}{\Sigma_k G(p - p_k)} = \frac{[G * \Sigma_k i_k \delta_{pk}](p)}{[G * \Sigma_k \delta_{pk}](p)} \quad (19)$$

where $\delta_{pk}$ is a Dirac distribution centered at $p_k$.

Finding the sampling points that are close enough to a given point is a time consuming task. Moreover, the positions of the sampling points are only known up to a certain accuracy and the resolution of the reconstruction is always limited by the spacing of the chosen grid $\Gamma$. Our method will therefore convert the point cloud to a list of pixels in the reconstruction grid $\Gamma$ by using a nearest neighbor rule. This mapping is the key to the very efficient method presented here.

---

Algorithm 1 (Discrete Shepard's like method).

1: Let $\{(p_k, i_k) \in \Omega \times R\}$ be the set of sampling points and their associated signal. Let $\Gamma$ be a chosen reconstruction grid.
2: Create two uniformly sampled images N and D defined on $\Gamma$ and initialized to zero.
3: for all point indexes k do
4:    Map the sampling point $p_k$ to the closest pixel $p_k^s$ of the chosen grid $\Gamma$.
5:    Update N: $N(p_k^s) \leftarrow N(p_k^s) + i_k$
6:    Update D: $D(p_k^s) \leftarrow D(p_k^s) + 1$
7: end for
8: Smooth N and D with a recursive Gaussian filter
9: Create the final reconstruction $R = \dfrac{N}{D}$

---

This scattered data approximation technique requires only two Gaussian filtering and one division and is thus very efficient. The smoothness is controlled by the variance of the Gaussian kernel.

5.2. Mosaic Construction

The above algorithm can further be tailored for the problem of mosaic reconstruction. Once an estimate $\hat{f}_n$ of the frame-to-reference mapping $f_n$ is available, we get a point cloud composed of all transformed sampling points from all the input frames $$\{(p_k, i_k)\} = \{(\hat{f}_n(p), I_n(p)) | p \in \Lambda_n, n \in [0, \ldots, N]\}, \quad (20)$$

where $\Lambda_n$ is the set of sampling points in the input frame n.

A common approach, when constructing mosaic images, is to minimize the seam artifacts by using feathering or alpha blending. With this approach, the mosaic image is a weighted average on the input images and the weighting factor depends, for example, on the distance to the center of the image. This allows to smooth the transitions between the input images.

Moreover one could have a confidence measure for each input frame based, for example, on the estimated velocity of the frame. Weighting the input frames with this confidence measure for the reconstruction of the mosaic could help getting a visually more pleasing mosaic image.

Both approaches reduce to weighting the importance of a given mapped input sampling point $p_k$ by some factor $\rho_k$. This weight can readily be used in (17) and we get:

$$\hat{\imath}(p) = \frac{\Sigma_k \rho_k i_k G(p - p_k)}{\Sigma_k \rho_k G(p - p_k)} = \frac{[G * \Sigma_k \rho_k i_k \delta_{pk}](p)}{[G * \Sigma_k \rho_k \delta_{pk}](p)}$$

Adapting the algorithm is thus straightforward. We only need to change the N and D update steps by $N(p_k^s) \leftarrow N(p_k^s) + \rho_k i_k$ and $D(p_k^s) \leftarrow D(p_k^s) + \rho_k$. Finally there is often no need to extrapolate the data too much or to reconstruct zones that have a very small confidence. This can easily be is achieved by setting the value of the mosaic to an arbitrary (but fixed) value when the total weight factor D(p) is below a predefined threshold.

6. Results

6.1. Experimental Evaluation

Figure 11:
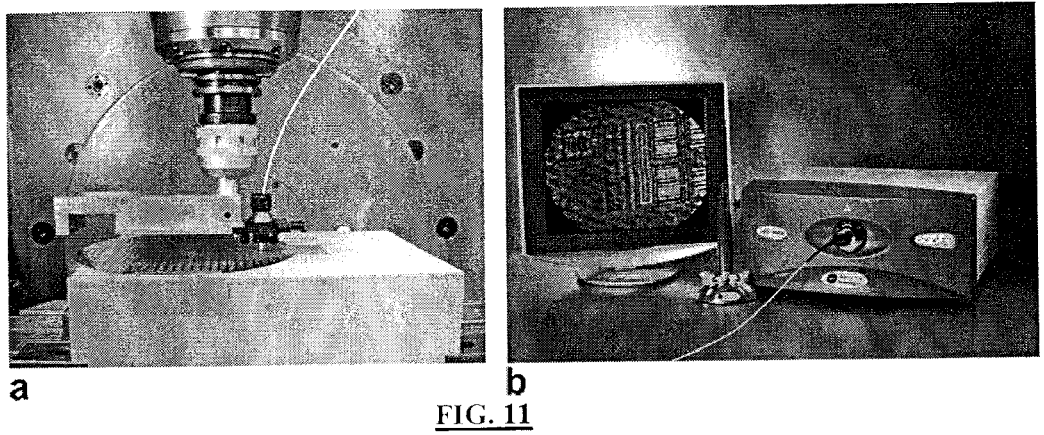
FIG. 11 illustrates an experimental system used to control the motion of the flexible microprobe with respect to the imaged rigid object (a silicon wafer); (a) The Deckel-Maho milling machine holding the flexible microprobe; (b) The Cellvizio©, fibered confocal microscope.

The experimental evaluation of our approach was carried out on a reflectance fibered confocal microscope from Mauna Kea Technologies shown in FIG. 11*b*. For the particular flexible microprobe we used throughout these experiments, the field of view is 220×200 µm.

In order to validate the global positioning and motion distortion compensation framework, image sequences of a rigid object were acquired. The object needed to have structures that could be seen with the reflectance fibered confocal microscope. For the mosaicing to be of interest, we also needed to see shapes whose size were larger than the field of view of our imaging device. We therefore chose to image a silicon wafer.

A fair evaluation can only be made by comparing the output of the algorithm with independent information. Apart from simulated data, a ground truth of the imaged region is very difficult to get. Even with a standard microscope having a comparable resolution but a greater FOV it is not easy to see on the wafer whether the exact same region is being imaged or not. In addition to the mosaic, our algorithm estimates the motion of the flexible microprobe. The following evaluations use a computer numerical control (CNC) milling machine, shown in FIG. 11*a*, to hold the flexible microprobe and prescribe a motion with respect to the silicon wafer whose accuracy is of the order of magnitude of the apparent fiber intercore distance $d_{ic}$=3.3/G=1.3 µm (G≈2.5 is the magnification of the flexible optical microprobe). This apparent fiber intercore distance can be thought of as the resolution of the system. We have thus been able to compare the prescribed motion with the recovered one.

6.1.1. Translational Motion

In the first experiment, the milling machine was programmed to perform two consecutive circles with a radius of 125 µm. The first circle is a clockwise one whereas the second one is a counterclockwise one. The final shape thus looks like an "8". The motion starts and ends at the center of this shape. The milling machine was programmed to keep a constant tangential velocity vector during the experiment. The radius of the circles were chosen so that in the middle of the circles a small blind zone remains. We therefore have both regions where many frames overlap (the center of the "8"), and regions where fewer frames do (the top and bottom of the "8").

Figure 12:
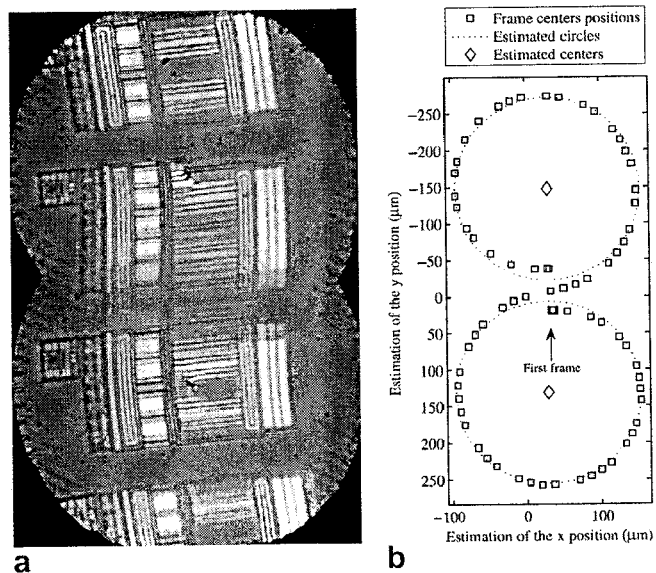
FIG. 12 illustrates mosaicing results using sequential rigid registrations only for a video sequence during which the milling machine performed two opposite circles of equal diameters; FOV: 465×725 μm; (a) Initial output mosaic of the wafer; (b) Estimated trajectory.

As a point of comparison, we compute an initial mosaic by registering the pairs of consecutive frames under a rigid motion assumption. An initial global positioning is computed by composing these local rigid body transformations. No frame distortion compensation is carried out. FIG. 12*a* shows this initial mosaic. As shown in this figure and on the reconstructed path in FIG. 12*b*, geometrical distortions appear. Note the global inconsistency of the alignments (due to accumulated registration errors) and the geometric distortions (due to uncompensated motion artifacts). The estimated motion is far from the prescribed "8" and the mosaic has a wavy aspect. Furthermore, the global inconsistency of the estimated transformations is seen on the mosaic (the input frames are not correctly aligned which is especially true in the middle of the "8"), and on the estimated trajectory (the estimation of the first and last frame centers are far away).

Figure 13:
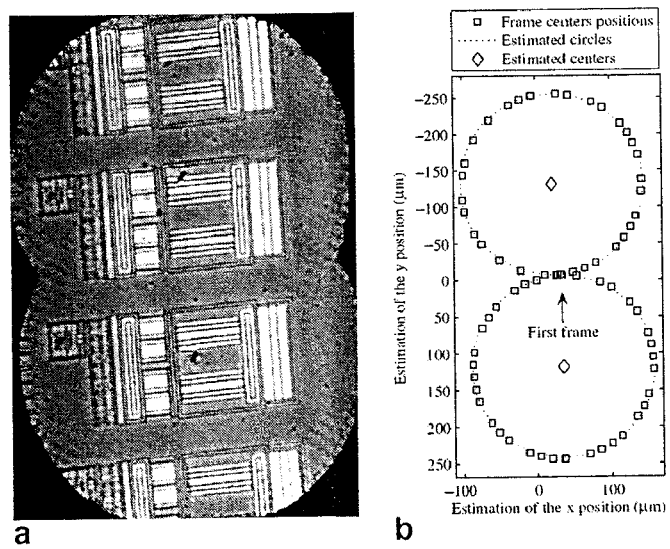
FIG. 13 illustrates mosaicing results using global frame positioning and motion distortion compensation on the same input sequence as in FIG. 12; FOV: 474×696 μm; (a) Globally consistent mosaic of the wafer; (b) Estimated trajectory.
Figure 14:
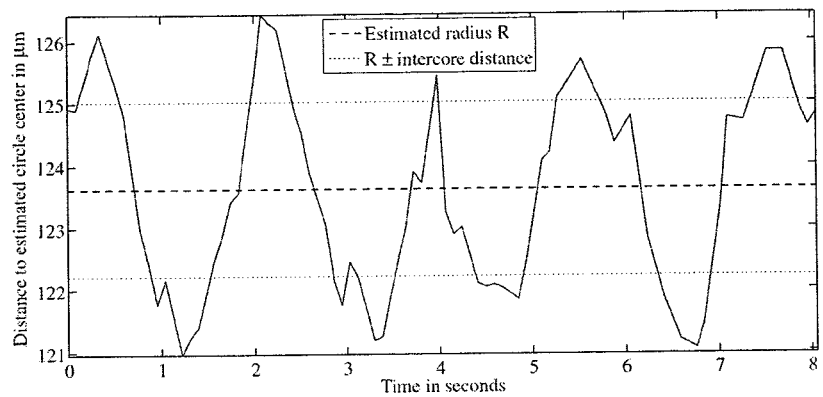
FIG. 14 illustrates distance of the estimated frame centers to the center of the circle that has been fitted to the estimated trajectory; the plot also shows the estimated radius and a band of width two times the fiber inter-core distance which provides an idea of the accuracy of the estimation.

In FIG. 13*a*, we applied our framework for global positioning and motion distortion compensation. The gain is clear both in terms of geometry of the reconstruction and visual quality. FIG. 13*b* shows the estimated motion. The best fitted circle are shown for each half trajectory. The radii of the estimated circles are $R_1$=123.5 µm and $R_2$=123.7 µm which is quite close to the 125 µm expected. The remaining difference can be explained by the uncertainty we have on the horizontal and vertical magnifications $G_x$ and $G_y$ of the flexible microprobe. An unmodeled discrepancy between these magnifications (i.e. $G_x \neq G_y$) could also explain the oscillations in the error plot FIG. 14.

Figure 15:
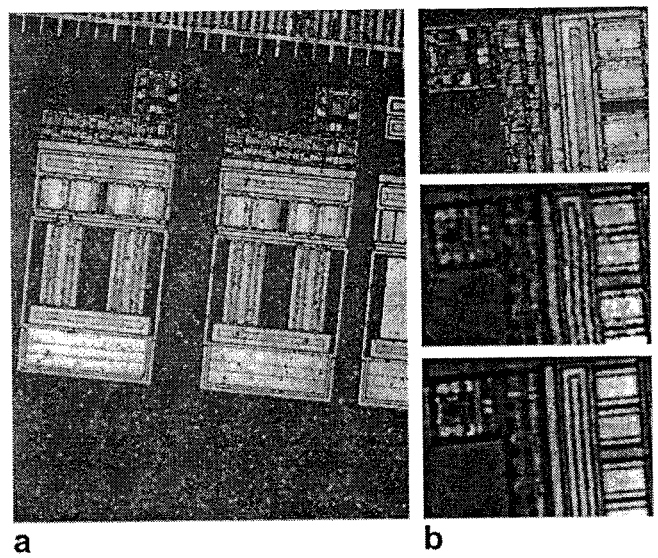
FIG. 15 illustrates comparison of our mosaic with a typical input frames and with an image acquired with a standard microscope; (a) Image of a similar zone of the silicon wafer acquired with a standard microscope; (b) Zoom on a portion of the wafer; Top to bottom: image acquired with a standard microscope; a typical input frame; the reconstructed mosaic.
Figure 16:
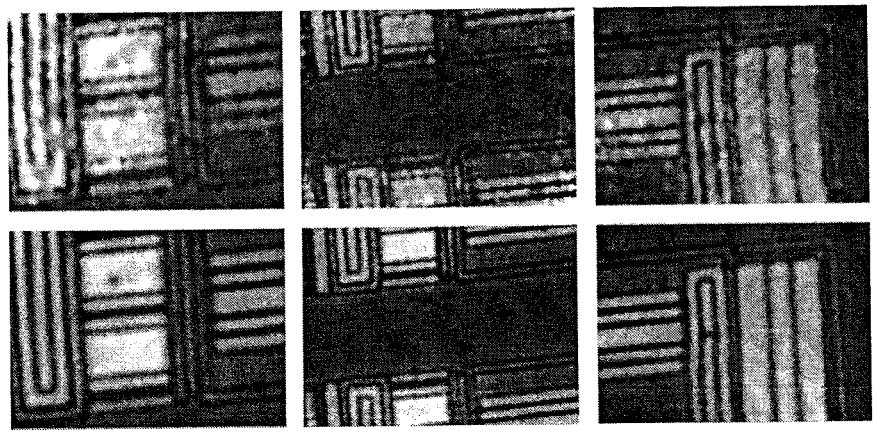
FIG. 16 illustrates Zoom on a portion of the wafer; the first line shows some input frames and the second shows the corresponding reconstruction; note the achieved gain in both noise level and resolution.

In order to further evaluate the quality of our reconstruction we used a standard microscope to acquire images of the silicon wafer on a similar zone (being able to image the very same spot is a very difficult task due to the redundancy of the wafer pattern). FIG. 15 shows this image. A comparison is made between the standard microscope, the reflectance fibered confocal microscope and our reconstruction from the FCM by showing a zoom on a particular structure. Note the enhancement in visual quality we get on the mosaic image with respect to the input signal we use. Because of the importance of the noise level on the input frames and of a small residual aliasing effect, our method is even capable of producing mosaics that have a better resolution that the input frames. This result is really crucial since we do not even need to perform computationally expensive super-resolution algorithms. The gain in resolution is clear on all parts of the mosaic as shown in FIG. 16.

6.1.2. General Motion

In the second experiment, the milling machine was again programmed to perform two circles with radius 125 Im. In addition to this motion, the table holding the silicon wafer was programmed to perform a rotation of angle $$-\frac{\pi}{3}$$

around a fixed axis. Both motions have been synchronized to start and end at the same time instant. The rotational velocity of the table was programmed to remain constant. Once again, the milling machine was programmed to keep a constant tangential velocity vector during the experiment. Because of the custom made part needed for the milling machine to hold the flexible microprobe, it was not possible to program the center of rotation of the table to be aligned with the center of the "8" motion imposed by the milling machine. We have however been able to roughly position it there.

Figure 17:
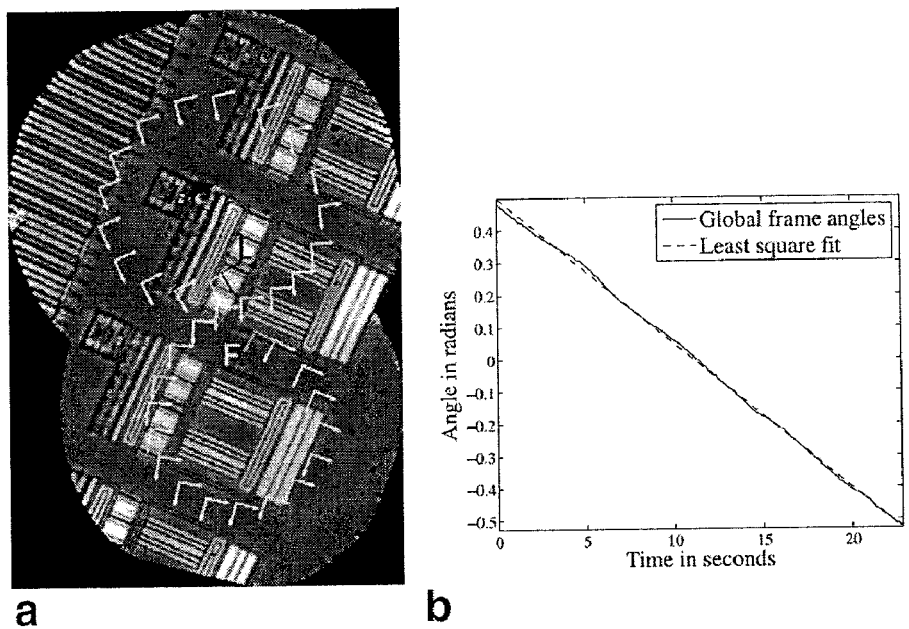
FIG. 17 illustrates mosaicing results using global positioning and motion distortion compensation for a video sequence during which the milling machine performed two opposite circles of equal diameters while, in the meantime, the table performed a rotation of angle $$-\frac{\pi}{3}$$

FIG. 17 illustrates mosaicing results using global positioning and motion distortion compensation for a video sequence during which the milling machine performed two opposite circles of equal diameters while, in the meantime, the table performed a rotation of angle $$-\frac{\pi}{3}$$

with constant angle velocity. The center of rotation of the table was relatively close to the center of the "8" motion imposed by the milling machine but remains unknown. FOV: 514×758 µm.

FIG. 17a shows the mosaic reconstructed using the present global frame positioning and motion distortions compensation algorithms. We have superimposed the estimated trajectory of the flexible microprobe together with two axes showing the estimated orientation of the flexible microprobe. For obvious reasons of clarity, only a subset of the estimated positions are shown. Note that the first and last frame (denoted by F and L in FIG. 17a) are not in the same position. This is due to the rotation center of the table not being aligned with the center of the first frame (i.e. the center of the "8" motion). FIG. 17b shows the estimated angular orientation of the frame together with the best fitted line. The total angle of $$-\frac{\pi}{3}$$

corresponds to a true angular velocity of $4.60 \times 10^{-2}$ rad/s. Using the above least-squares fit of the orientation, the estimated angular velocity is $4.50 \times 10^{-2}$ rad/s which is once again very close to the ground truth.

Figure 18:
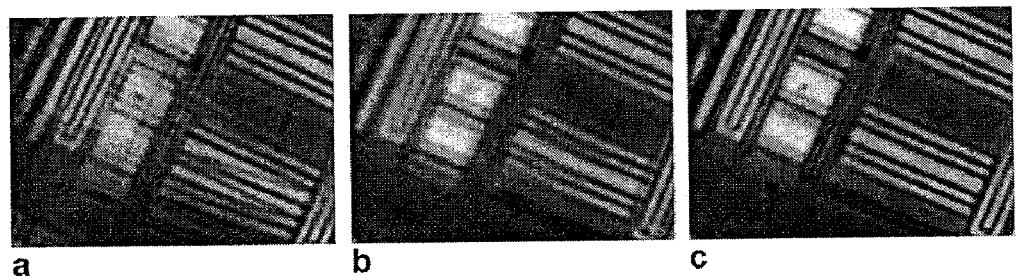
FIG. 18 illustrates Zoom on a portion of the reconstructed mosaic using the same input sequence as in FIG. 17. (a) Mosaic using sequential rigid registrations only; (b) Mosaic using sequential rigid registrations and motion distortion compensation; (c) Mosaic using global frame positioning and motion distortion compensation.

The power of our hierarchical scheme is shown in FIG. 18 where different reconstructions are compared. The first reconstruction uses sequential rigid registration only, global inconsistency is obvious. The second shows the reconstruction using motion distortion compensation but no global alignment. Residual global misalignment implies a blurred result. On the other hand, the mosaic using both global alignment and motion distortion compensation is really crisp.

6.2. In Vivo Studies

Fibered confocal microscopy is designed to visualize cellular structures in living animals. We applied our mosaicing algorithm to different types of tissue imaged in vivo with the Cellvizio© as presented in FIG. 3. We will first discuss the results obtained for colon imaging in detail. Then we briefly present the results obtained with the other sequences.

6.2.1. Colon Imaging

In the field of colon cancer research, the development of methods to enable reliable and early detection of tumors is a major goal. In the colon, changes in crypt morphology are known to be early indicators of cancer development. The crypts that undergo these morphological changes are referred to as Aberrant Crypt Foci (ACF) and they can develop into cancerous lesions.

In laboratory rodents, ACF can either be induced by colon-specific carcinogens or through transgenic mutations. As in humans, ACF in mice are known to be reliable biomarkers for colon cancer and are used to study initiation, promotion and chemoprevention of colorectal cancer. Currently, ACF are routinely imaged, detected and counted under a dissecting microscope following staining with methylene blue. In order to do this, the animal is sacrificed and the whole colon is excised and opened flat.

Compared to this method, fluorescence FCM enables the operator to see the lesions in real-time and to make an almost immediate evaluation without sacrificing the animal. This offers the possibility of studying groups of individual animals over extended periods with the benefits of reduced inter-animal statistical variation and reduced number of animals used per experiment. However, in many cases the limited field of view restricts the confidence that the operator has in the ACF counting.

By offering an extended field of view, mosaicing techniques can be an answer to this restriction.

The effectiveness and relevance of the proposed algorithm for this study are shown on a sequence that has been acquired in vivo on a mouse colon stained with acriflavine at 0.001%. The mouse was treated with azoxymethane (AOM) to induce a colon cancer. The input sequence is composed of fifty frames, each with a field of view of 425 μm by 303 μm. As shown in FIG. 19c, our algorithm allows for a simultaneous visualization of normal and aberrant crypts.

FIG. 19b shows the improvement we make with respect to a simple mosaic construction, shown in FIG. 19a, by using the global positioning and motion distortion compensation. The imaged tissue is really soft and non-linear deformations also occur. FIG. 19c illustrates the gain we obtain by taking into account those non-rigid deformations. Some details are lost if we only use rigid body transformations and reappear on our final mosaic. The global frame positioning mosaicing took approximately 3 min on a 2 GHz P4 and 15 min if the non-rigid deformations are compensated.

Our method has also been successfully applied to many other types of sequences acquired in both mouse and human colon as shown in FIG. 20. FIG. 20a provides another example using a sequence that has been acquired on a mouse colon stained with acriflavine. In FIG. 20b, the vascularization of the mouse colon was imaged after injection of FITC-Dextran high MW. We also provide results on sequences that have been acquired ex vivo in the human colon. FIG. 20c uses reflectance FCM whereas FIG. 20d uses a sequence acquired with a 660 nm fluorescence FCM after methylene blue staining.

6.2.2. Other Examples

The Cellvizio© offers a new way to image and characterize many types of tissue. In many cases, mosaicing can help move beyond the limitations of FCM by offering an extended field of view. We provide some insight of this by showing the result of our algorithm on the remaining sample sequences shown in FIG. 3.

FIG. 21a shows a mosaic constructed from 21 input frames, each with a FOV of 417 μm by 297 μm. In this figure, we can see mouse tumoral angiogenesis. The need for in vivo imaging is urgent in this field. It can indeed help assess the efficiency of angiogenesis therapy. Mosaicing techniques can further help in getting objective quantitative measurements. The result shown in FIG. 21b is of much clinical interest since it proves that obtaining a microscopic images of human lung tissue without any staining is feasible. Our mosaicing algorithm pushes this interest one step further by showing multiple alveolar structures on a single image. The mosaic in FIG. 21c, arising from 31 input frames, shows the tubular architecture of the kidney. In this setting, mosaicing could help getting objective statistical shape measurements.

FIG. 21d shows the ability of the Cellvizio© to image nervous tissue down to the dendritic endings and shows how mosaicing can help seeing many of those dendritic endings simultaneously. 70 input frames all with a FOV of 397 μm by 283 μm were used to produce the mosaic.

Figure 22:
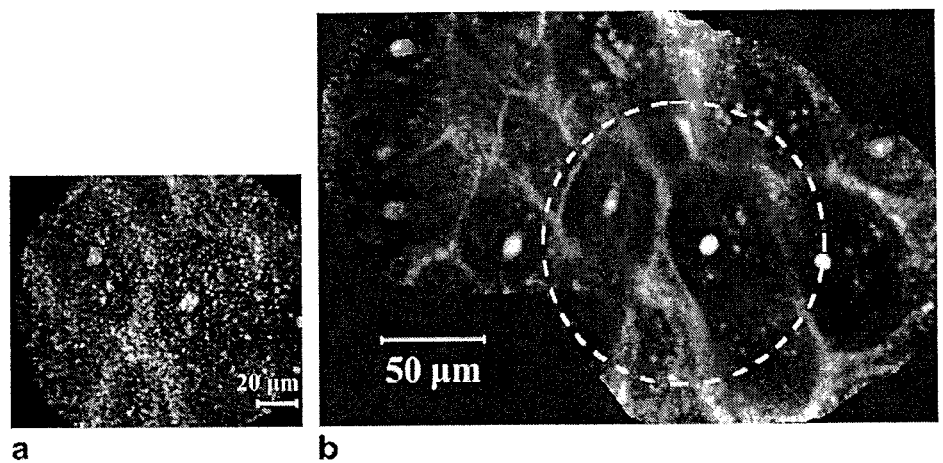
FIG. 22 depicts Reflectance imaging of human mouth mucosa; (a) First frame of the input sequence (cf.

FIG. 22 clearly shows that even in the in vivo case, we are able to get a real gain both in terms of noise level and resolution. The input sequence was composed of 101 images from the human mouth mucosa that have a FOV of 150 μm by 125 μm.

Figure 21:
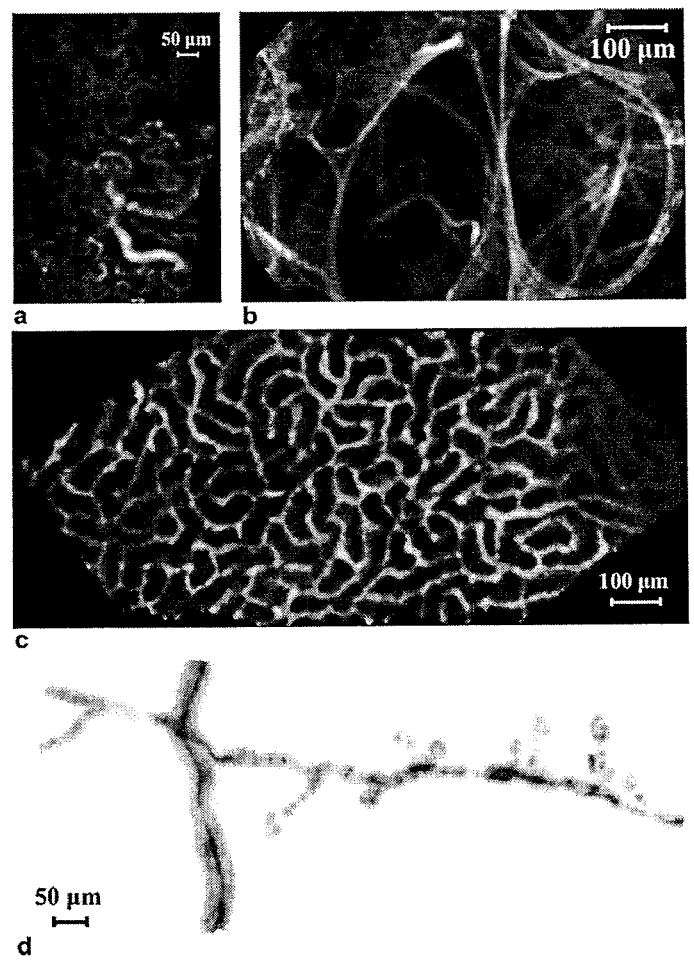
FIG. 21 illustrates Pseudo-color mosaics using different types of images acquired with the Cellvizio©; (a) In vivo tumoral angiogenesis in mouse with FITC-Dextran high MW (21 input frames); (b) Ex vivo autofluorescence imaging in human lung (15 input frames); (c) Microcirculation of the peritubular capillaries of a live mouse kidney with FITC-Dextran high MW (31 input frames); (d) Dendritic receptors in a live Thy1-YFP mouse (70 input frames)

The results shown in FIGS. 19, 21 and 22 prove the feasibility of mosaicing for in vivo soft tissue microscopy.

In conclusion, the present invention concerns a new method of video mosaicing for in vivo soft tissue fibered confocal microscopy. A fully automatic robust hierarchical approach is proposed. For example, rigorous tools for estimation problems on Lie groups are used to develop a robust algorithm to recover consistent global alignment from local pairwise registration results. A model of the relationship between the motion and the motion distortion is developed and used to robustly compensate for the motion distortions arising when using a laser scanning device. An efficient scattered data fitting technique is proposed for the construction of the mosaic. This tool is also used to adapt the demons algorithm for non-rigid registration with irregularly sampled images.

Appendix

Lie group tools for 2D rigid transformations

In this section, we provide the explicit expressions of the tools defined in Section 4 for the specific case of interest, the 2D rigid body transformations $\mathfrak{R}$.

A rigid body transformation r is composed of a rotation of angle θ (expressed in [0,2π] mod(2π)) followed by a translation $\tau=(\tau^x,\tau^y)$. This set of parameters provides a chart or local coordinate system. The composition and inversion are easily expressed in this coordinate system.

Let $r_1$ and $r_2$ be two rigid body transformations represented by $(\theta_1,\tau_1)$ and $(f_2,\tau_2)$, we have:

$$r_2 \circ r_1 : (\theta_2+\theta_1, R_{\theta_2}\tau_1+\tau_2),$$

$$r^{-1} : (-\theta, -R_{-\theta}\tau),$$

where $$R_\alpha = \begin{bmatrix} \cos(\alpha) & -\sin(\alpha) \\ \sin(\alpha) & \cos(\alpha) \end{bmatrix}$$

is a rotation matrix. In this coordinate system, the differential maps previously presented are given by:

$$DL_r(s) = \begin{bmatrix} 1 & 0 & 0 \\ 0 & \cos(\theta) & -\sin(\theta) \\ 0 & \sin(\theta) & \cos(\theta) \end{bmatrix},$$

$$DR_r(s) = \begin{bmatrix} 1 & 0 & 0 \\ -\sin(\theta)\tau_s^x - \cos(\theta)\tau_y^y & 1 & 0 \\ \cos(\theta)\tau_s^x - \sin(\theta\tau_y^y) & 0 & 1 \end{bmatrix},$$

$$DInv(r) = \begin{bmatrix} -1 & 0 & 0 \\ \sin(\theta)\tau^x - \cos(\theta)\tau^y & -\cos(\theta) & -\sin(\theta) \\ \cos(\theta)\tau^x + \sin(\theta)\tau^y & \sin(\theta) & -\cos(\theta) \end{bmatrix}.$$

We can notice here that the left composition differential map $DL_r(s)$ does not depend on s.

We now look at the left-invariant Riemannian metric G(x) we use on this Lie group. Let $u_1=(d\theta_1,d\tau_1)$ and $u_2=(d\theta_2,d\tau_2)$ be elements of the Id-tangent space $T_{Id}(\mathfrak{R})$.

We choose the canonical dot product on $T_{Id}(\mathfrak{R})$:

$$\langle u_1 | u_2 \rangle_{Id} = d\theta_1 d\theta_2 + d\tau_1^T \cdot d\tau_2 \Leftrightarrow G(Id)=I_3,$$

According to (3), the left invariant metric is thus given, at all points, by the matrix $G(x)=DL_r^{-T} \cdot I_3 \cdot DL_r^{-1}=I_3$. The Riemannian metric is, in this case, of the simplest possible form and does not depend on the tangent space. This particular Lie group is thus flat and geodesics are straight line. The Riemannian logarithm at the identity is therefore simply given by the parameters expressed in the chart we chose:

$$\log_{Id}(r)=[\theta,\tau^x,\tau^y].$$

Another common choice, would be to take $G(Id)=\mathrm{diag}([\lambda^2,1,1])$ in order to weight the influence of the angles with respect to the translation, but using the Mahalanobis distance defined in Section 2.3 makes this weighting unnecessary.

Although the present invention and its advantages have been described in detail, it should be understood that various changes and substitutions can be made herein without departing from the principle and the scope of the invention. Accordingly, the scope of the present invention should be determined by the following claims and their legal equivalents.

The invention claimed is:

1. A method for mosaicing frames from a video sequence, each frame being constituted by a point cloud, each point in the point cloud being potentially acquired at a different time, the method comprising:
   a) compensating for motion and motion distortion due to acquisition time differences in each frame;
   b) applying a global optimization of inter-frame registration to align consistently the frames; and
   c) applying a reconstruction algorithm on the registered frames to construct a mosaic.

2. The method according to claim 1, wherein step a) further comprises:
   a1) applying local pairwise rigid registration,
   a2) estimating a set of globally consistent transformations, and
   a3) using a transformation to correct motion distortions.

3. The method according to claim 2, wherein steps a1, a2, and a3 constitute an iteration loop.

4. The method according to claim 3, wherein steps c) and d) constitute another iteration loop.

5. The method according to claim 2, wherein during step a2, a least square criterion is applied to optimize on a transformation space.

6. The method according to claim 1, wherein an acquisition device for acquiring each point in the point cloud is a scanning microscope.

7. The method according to claim 1, wherein an acquisition device for acquiring each point in the point cloud is a scanning microscope with flexible fibered microprobe.

8. The method according to claim 1, wherein an acquisition device for acquiring each point in the point cloud is a fibered confocal microscope using a bundle of fiber optics.

9. The method according to claim 1, further comprising fine frame-to-mosaic non-rigid registration.

10. The method according to claim 1, wherein step c) comprises an interpolation.

11. The method according to claim 1, wherein step c) comprises an approximation.

* * * * *